C. BAUER.
COMBINATION TOOL.
APPLICATION FILED JUNE 1, 1912.
1,039,482.
Patented Sept. 24, 1912.
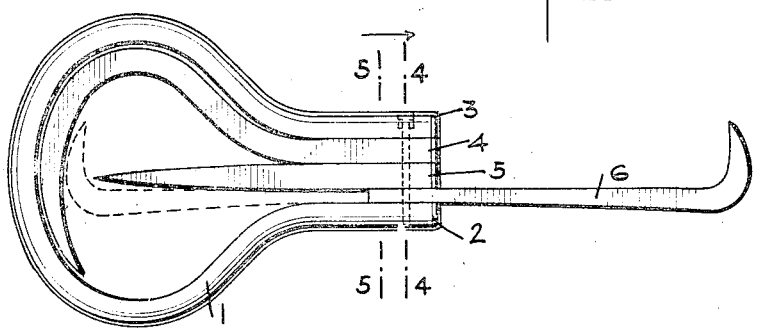
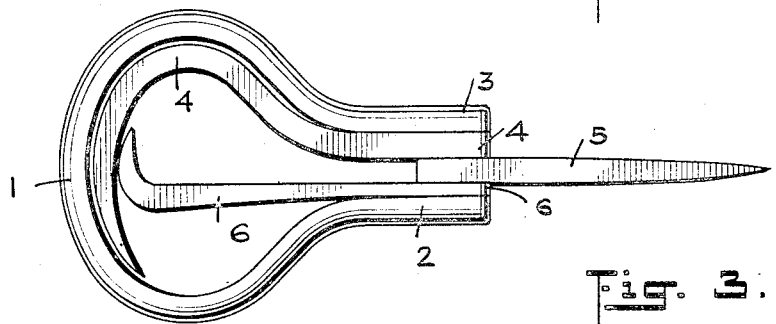
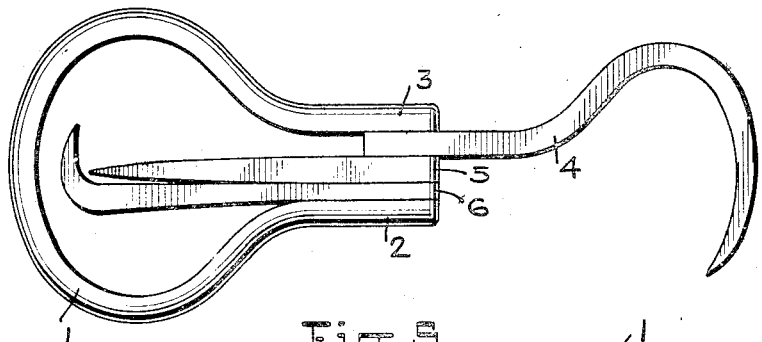
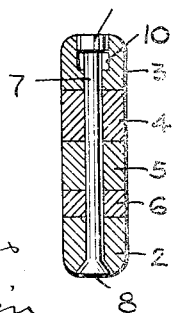
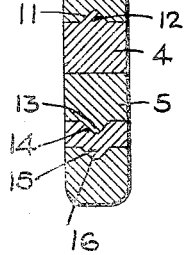
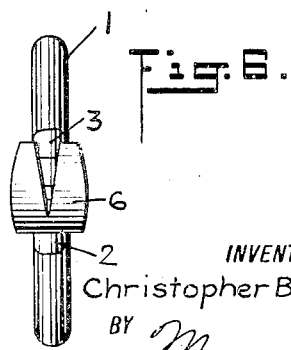
WITNESSES
Sidney Brooks
A. L. Kitchin
INVENTOR
Christopher Bauer
BY
Munn & Co
ATTORNEYS

UNITED STATES PATENT OFFICE.

CHRISTOPHER BAUER, OF CLARA CITY, MINNESOTA.

COMBINATION-TOOL.

1,039,482.

Specification of Letters Patent. Patented Sept. 24, 1912.

Application filed June 1, 1912. Serial No. 700,918.

*To all whom it may concern:*

Be it known that I, CHRISTOPHER BAUER, a citizen of the United States, and a resident of Clara City, in the county of Chippewa and State of Minnesota, have invented a new and Improved Combination-Tool, of which the following is a full, clear, and exact description.

This invention relates to improvements in tools, especially of the combination variety, in which a plurality of interacting and associated members are arranged to be operated from a single supporting handle, and has for an object to provide an improved structure in which the various operating members may be moved from an operative to an inoperative or closed position by a lateral pressure exerted upon the various implements.

Another object of the invention is the provision of a spring handle so constructed as to receive a plurality of implements designed to be folded into the handle when not in use, and to be moved pivotally therefrom when in use, the construction and arrangement of the handle acting as a spring clamping means for holding the tools in either position.

In carrying out the objects of the invention, a handle is formed substantially with a looped end having engaging arms normally tending to move toward each other, between which the ends of the respective tools or implements are placed. A suitable pivotal pin is passed through all of the implements so that the same swing on the same pivotal center and may be moved in and out as desired, the respective implements being provided with projections co-acting with suitable sockets for locking the implements in either a folded position or an unfolded position.

A practical embodiment of the invention is represented in the accompanying drawings forming a part of this specification, in which similar characters of reference indicate corresponding parts in all the views.

Figure 1 is a side view of an embodiment of the invention with one of the implements shown in operative position, and in a folded or inoperative position in dotted lines; Fig. 2 is a side view of the construction shown in Fig. 1 with a different implement from that shown in Fig. 1 projecting outwardly in an operative position; Fig. 3 is a view similar to Fig. 2 except that a different tool or implement is shown in an operative position; Fig. 4 is a section through Fig. 1 on the line 4—4, the same being shown on an enlarged scale; Fig. 5 is a section through Fig. 1 on the line 5—5, the same being shown on an enlarged scale; and Fig. 6 is an end view of the structure shown in Fig. 1.

In constructing a tool embodying the invention the same is designed to be used as an emergency tool operating upon horses' feet and for use in repairing harness, but it will be evident that the tool could be used for various other purposes without departing from the spirit of the invention.

Referring to the accompanying drawings by numerals, 1 indicates a handle formed of spring metal with arms 2 and 3. The handle 1 is formed so that the arms 2 and 3 tend to approach each other whereby the tools 4, 5, and 6, are clamped properly in place. As shown in the drawings the tool 4 is a hook for picking out any foreign matter from the horse's foot, or operating as a combined hook and pick for any desired purpose. The tool 5 is substantially square in cross section and is beveled to a point and acts as a pointed instrument for picking out any desired object, and also as an awl or gimlet. The tool 6 is bifurcated at its outer end so as to provide means for pulling nails from a horse's hoof or feet. This nail pulling structure could be used, of course, equally well for pulling nails from other places than horses' feet, although the same is especially adapted therefor by the size and curvature of the bifurcated portion.

In order to properly hold the tools 4, 5, and 6 in place and cause the same to move pivotally around a certain point or line, a pivotal pin 7 is provided which extends entirely through the arms 2 and 3, and through the ends of all of the tools, as clearly shown in Fig. 4. The pin 7 is formed with a head 8 preferably countersunk in arm 2, while the opposite end is provided with a head 9 designed to reciprocate in a bore 10 formed in the arm 3. The head 9 does not in a certain sense reciprocate in the bore 10, but the arm 3 is caused to move back and forth as the tools are moved from one position to another. The arm 3 on its inner surface is provided with a groove 11 in which a bead 12 is adapted to fit. The groove 11 and the bead 12 are formed substantially A-shaped in cross section, whereby the same may be caused to engage and disengage by an appreciable lateral or side pressure against the tool 4. At the side opposite the bead 12 the tool 4 is perfectly plane or even, which surface co-acts with a plane or even surface on the tool 5. However, tool 5 is provided with a bead 13 similar to the bead 12, except that the same extends in an opposite direction for fitting into a groove 14 in the tool 6. The tool 6 is also provided with a bead 15 fitting into a groove 16, in the arm 2. It will be perfectly evident that when any of the tools are moved from one position to the other, the bead of that particular tool must move out of its groove and will consequently separate the arms 2 and 3 so that the provision of the head 9 and bore 10 is necessary for accommodating this movement. The beads and grooves are made parallel with the arms 2 and 3 so that the tools are held positively in a folded or inner position in which they are surrounded by the handle 1 or held positively in an outer position. When all of the tools are folded into the handle 1, the sharp or pointed ends or other cutting portions of the tools are protected and also protect any one handling the tools against being accidentally injured.

It will be noticed that the intermediate tool 5 is guarded by the outer tools 4 and 6 especially at the point portion of the tool 5. In this connection, it will be seen especially from Figs. 1, 2 and 3 that the tools 4 and 6 are arranged on opposite sides of the tool 5 and are pivoted concentrically with said tool 5 and have their outer ends turned in opposite directions and toward each other so that the turned or hooked portions of the tools 4 and 6 overlap from opposite directions the point of the tool 5, thus guarding the said point and reducing the possibility of the point coming in contact with the garment of the user whether the tool be carried in the pocket or elsewhere.

Having thus described my invention I claim as new and desire to secure by Letters Patent:—

1. In a tool of the class described, a pair of resilient supporting arms, one of said arms being formed with an aperture therethrough merging into an enlarged bore extending partially therethrough, a pivotal pin extending through said arms formed with an enlarged head fitting in said enlarged bore, said enlarged bore permitting said arms to move back and forth, a plurality of implements journaled on said pin, each of said implements being formed with raised portions, and each of said arms being formed with grooves for accommodating the raised portions when the implements are in an outer and inner position whereby the implements are locked in said positions, the construction of said enlarged bore and said pin being such as to permit said arms to separate when either of said implements are moved so that their particular bead will be moved out of its co-acting groove.

2. In a tool of the class described, a handle formed of resilient material having a looped portion merging into a pair of tool retaining arms, each of said arms being formed with an aperture and one of said arms being formed with an enlarged bore, a pivotal pin fitting into said apertures formed with an enlarged head whereby the arm having the enlarged bore may move back and forth freely within certain limits, each of said arms being formed with a groove extending longitudinally thereof, and a plurality of implements arranged between said arms, each of the implements arranged in contact with said arms being formed with a bead for fitting into the grooves of said arms, the resilient construction of the handle and arms causing a clamping action of the arms against said implements so that the same will normally be held against movement when the respective beads are in engagement with the respective grooves.

3. In a combination tool, a handle formed into a loop having a pair of radiating spaced clamping members, each of said members being formed with an aperture therein, one of said apertures having an enlarged bore merging therein, a pin formed with a head at each end, said pin extending through said apertures with one head resting against the exterior of one of said radial members and with the other head mounted in said enlarged bore whereby the radial member may freely separate within certain limits, and a plurality of tools pivotally mounted on said pin each of which is provided with a longitudinally positioned bead and one of said tools is provided with a longitudinal groove designed to at times register with the adjacent bead, said radial members being each provided with a longitudinally arranged groove co-acting with some of said beads.

4. A combination tool comprising a handle formed into a loop having clamping members, an intermediate tool and tools on opposite sides of said intermediate tool, said tools being pivoted at one end between the clamping members and adapted to fold at their free ends into the space within the handle loop, the intermediate tool being shorter than the said other tools on opposite sides thereof and said tools on opposite sides of the intermediate tool having their outer ends turned inwardly toward each other forming hook like portions which project inwardly from opposite sides of the intermediate tool and overlap the point of said tool when the several tools are folded into the handle loop whereby to guard the point of said intermediate tool, substantially as set forth.

In testimony whereof I have signed my name to this specification in the presence of two subscribing witnesses.

CHRISTOPHER BAUER.

Witnesses:
A. F. PRINS,
A. ORBBEKE.